United States Patent
Samukawa et al.

[11] Patent Number: 5,607,105
[45] Date of Patent: Mar. 4, 1997

[54] VEHICULAR AIR-CONDITIONER

[75] Inventors: Katsuhiko Samukawa, Oobu; Yuji Honda, Okazaki, both of Japan

[73] Assignee: Nippondenso Co., Ltd., Kariya, Japan

[21] Appl. No.: 508,548

[22] Filed: Jul. 28, 1995

[30] Foreign Application Priority Data

Jul. 29, 1994 [JP] Japan .................. 6-178248
Jul. 29, 1994 [JP] Japan .................. 6-178249

[51] Int. Cl.⁶ .................................... F24F 7/00
[52] U.S. Cl. .................. 236/49.3; 62/186; 165/203
[58] Field of Search .............. 62/179, 186; 236/49.3, 236/91 C; 165/43, 203

[56] References Cited

U.S. PATENT DOCUMENTS

| 4,462,218 | 7/1984 | Yamanaka | 62/175 |
| 4,518,032 | 5/1985 | Funasaki et al. | 165/12 |
| 4,665,971 | 5/1987 | Sakurai | 165/22 |
| 4,711,295 | 12/1987 | Sakurai | 62/244 X |
| 4,800,951 | 1/1989 | Sakurai | 165/22 |
| 5,400,963 | 3/1995 | Ishikawa et al. | 236/49.3 |
| 5,452,587 | 9/1995 | Honda et al. | 236/49.3 |

FOREIGN PATENT DOCUMENTS

| 58-33509 | 2/1983 | Japan . |
| 5-286338 | 11/1993 | Japan . |
| 2161298 | 1/1986 | United Kingdom . |
| WO92/01580 | 2/1992 | WIPO . |

Primary Examiner—William E. Wayner
Attorney, Agent, or Firm—Cushman, Darby & Cushman IP Group of Pillsbury Madison & Sutro LLP

[57] ABSTRACT

A vehicular air-conditioner which ensures the flow of air required for independent control of the temperatures of the driver's side and passenger's side of the vehicle compartment by using as the final blower voltage the mean value of the blower voltage corresponding to the target blowing temperature of the driver's side and the blower voltage corresponding to the target blowing temperature of the passenger's side.

10 Claims, 9 Drawing Sheets

VEHICULAR AIR-CONDITIONER

BACKGROUND OF THE INVENTION

1. Field of the Invention

The present invention relates to a vehicular air-conditioner able to independently control the temperatures of a first air-conditioning zone and a second air-conditioning zone in a compartment of the vehicle.

2. Description of the Related Art

As disclosed in Japanese Unexamined Patent Publication (Kokai) No. 5-286338, there is known a vehicular air-conditioner designed to independently control the temperatures of the air blown to the driver's side and to the passenger's side in a car and the blowing modes of each side. In this related art, the target blowing temperatures were calculated from the temperature settings for the sides, the temperature of the inside air, the temperature of the outside air, etc. and these target blowing temperatures were used to control the blowing temperatures and the blowing modes.

Figure 10:
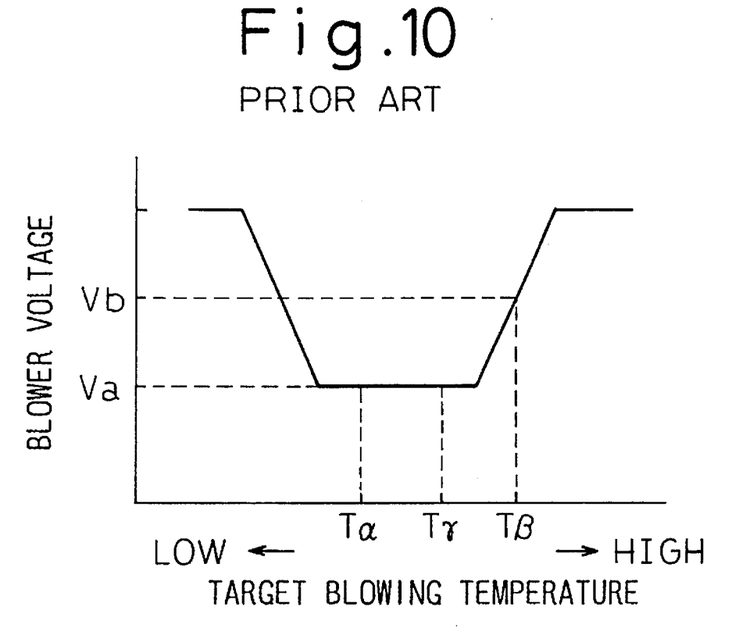
FIG. 10 is an explanatory view of a conventional method of determination of the blower voltage.

Further, in this related art, the method used for determining the blower voltage, that is, the voltage to be applied to the blower, was to find the mean value of the target blowing temperatures and to find the blower voltage based on that mean value and the characteristics shown in FIG. 10.

If the blower temperature is determined based on the mean value of the target blowing temperatures and the characteristics of FIG. 10, the following problem sometimes occurs, however.

When the target blowing temperature of the driver's side is $T\alpha$ and the target blowing temperature of the passenger's side is $T\beta$, for example, the blower voltage corresponding to the mean value $T\gamma$ of $T\alpha$ and $T\beta$ ($=(T\alpha+T\beta)/2$) is determined as Va from FIG. 10. If the blower voltage is determined as Va, then, as clear from FIG. 10, enough of a flow of air is secured for the target blowing temperature of the driver's side ($T\alpha$), but it is considerably smaller than the flow of air for the target blowing temperature of the passenger's side ($T\beta$), that is, the blower voltage Vb.

Since the driver's side is next to the passenger's side, however, the temperatures of the two sides tend to affect each other. Therefore, independent control of the temperature of the driver's side and the temperature of the passenger's side requires that a sufficient flow of air be secured to blow to each side. If, like in the above related art, however, the voltage applied to the blower becomes considerably smaller than the blower voltage determined by either of the target blowing temperatures, it becomes difficult to independently control the temperatures of the two sides.

Also, as disclosed in the above Japanese Unexamined Patent Publication (Kokai) No. 5-286338, there is known a vehicular air-conditioner which calculates the target blowing temperatures from the temperature setting for the driver's side, the temperature setting for the passenger's side, the temperature of the inside air, the temperature of the outside air, etc. and independently controls the blowing temperatures to the sides based on these target blowing temperatures wherein, when the temperature setting for the driver's side and the temperature setting for the passenger's side were different, the target blowing temperatures were corrected in accordance with the difference of the two temperature settings so as to more precisely control temperatures of the two sides.

As mentioned above, however, it is difficult to independently control the temperature of the driver's side and the temperature of the passenger's side when the flow of air into the compartment is small. That is, if the flow of air is small, it is not possible to provide a predetermined difference to the amount of heat supplied to the individual sides unless a corresponding difference to the temperatures of the blown air is also provided. In practice, however, too much of a temperature difference given to the air blown to the individual sides is uncomfortable to the occupants of the compartment, so it is not practical to create too much of a temperature difference to the blown air.

In this way, it is difficult to independently control the temperatures of the individual sides unless there is at least a certain minimum amount of air blown. The above related art, however, makes no mention at all of this point. Accordingly, the related art might be effective when there is a certain amount of air blown, but ends up losing all meaning when the amount of air blown is small.

Also, the above type of problem does not occur only in vehicular air-conditioners for independently controlling the temperatures of the driver's side and the passenger's side. It similarly occurs in air-conditioners for independently controlling the temperatures of any first air-conditioning zone and second air-conditioning zone.

SUMMARY OF THE INVENTION

The present invention, in view of the above problem in the related art, has as its object the provision of a vehicular air-conditioner able to independently control the temperatures of a first air-conditioning zone and a second air-conditioning zone in a compartment.

To achieve the above object, according to a first aspect of the present invention, the mean voltage of the blower voltage corresponding to the target blowing temperature of the driver's side and the blower voltage corresponding to the target blowing temperature of the passenger's side is used as the final blower voltage. Due to this, it is possible to secure both the required flow of air for the target blowing temperature of the driver's side and the passenger's side. Further, it is possible to prevent the flow of air from becoming greater than required.

According to a second aspect of the present invention, a first blower voltage is calculated by the mean value of voltages as in the first aspect and then a second blower temperature, required for independently controlling the temperatures of the driver's side and the passenger's side, is calculated from the difference between the temperature setting of the driver's side and the temperature setting of the passenger's side. The larger of these blower voltages is used as the final blower voltage. Due to this, the blower voltage is always at least the blower voltage required and, therefore, the minimum flow of air required for independent control of the temperatures of the driver's side and the passenger's side can always be ensured.

BRIEF DESCRIPTION OF THE DRAWINGS

These and other objects and features of the present invention will become clear from the following description of the preferred embodiments with reference to the attached drawings, in which.

DESCRIPTION OF THE PREFERRED EMBODIMENTS

Next, the present invention will be explained with reference to a first embodiment used as a vehicular air-conditioner for independently controlling the temperatures of the driver's side and the passenger's side of a car. First, the overall configuration of the embodiment will be explained with reference to FIG. 1.

Figure 1:
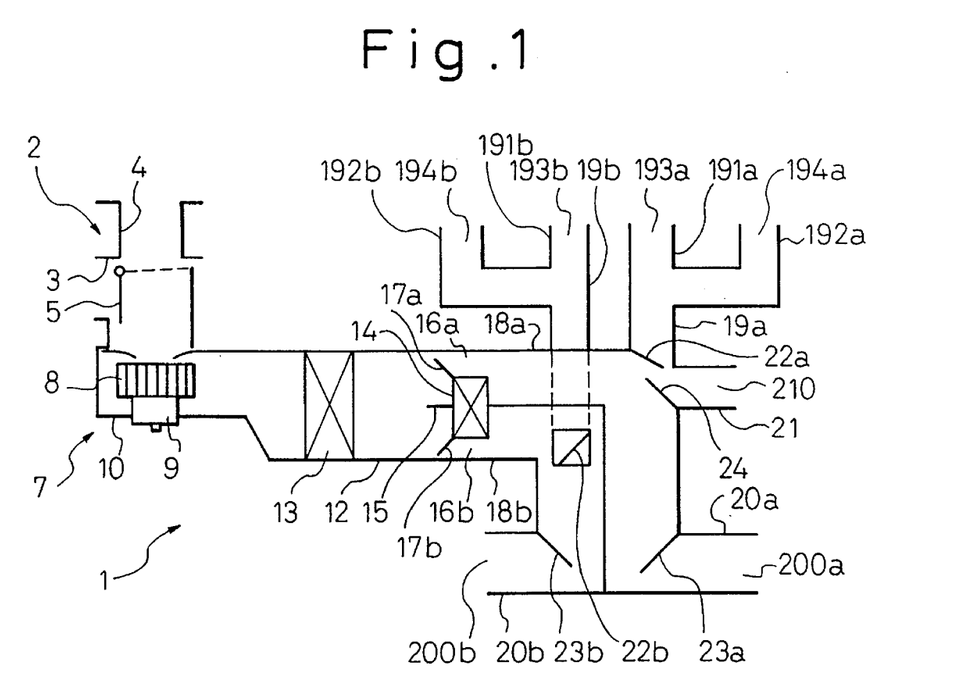
FIG. 1 is a view of the overall configuration of a first embodiment of the present invention.

In FIG. 1, 1 indicates the overall air-flow system of the vehicular air-conditioner. The bulk of the air-flow system 1 is disposed underneath of the instrumentation panel in the compartment of the vehicle.

An inside/outside air switchbox 2 is provided at a position at the upstream air side of the air-flow system 1. The inside/outside air switchbox 2 is formed with an inside air inlet 3 and an outside air inlet 4. Further, an inside/outside air switching door 5 for selectively opening and closing the two inlets is provided at the portion between the inside air inlet 3 and the outside air inlet 4. A drive means 6 (specifically, a servo motor, see FIG. 2) is connected to the inside/outside air switching door 5.

A centrifugal type electrically driven blower 7 is provided as a blowing means at the air outlet of the inside/outside air switchbox 2. This blower 7 is comprised of a centrifugal fan 8, a drive use blower motor 9, and a scroll casing 10 accommodating the centrifugal fan 8. Further, the blower voltage applied to the fan motor 9 is controlled by the blower controller 11 (see FIG. 2).

Reference numeral 12 is a case of the air-conditioning unit, which is connected to the portion of the scroll casing 10 on the air outlet side. Inside case 12 is an evaporator 13 serving as the air cooling means and a heater core 14 serving as the air heating means on the downstream air side. Further, in the case 12 at the two sides of the heater core 14 (top and bottom in FIG. 1), there are formed bypasses 16a and 16b for enabling the cold air cooled by the evaporator 13 to bypass the heater core 14.

At the upstream air side of the heater core 14 is provided a means for regulating the temperature of the air in the case 12, specifically, two air mix doors 17a and 17b. These doors 17a and 17b are driven by respective drive means 27a and 27b (specifically, servo motors, see FIG. 2). The amount of the cold air from the evaporator 13 which passes through the heater core 14 at the top of the figure and the amount which passes through the bypass 16a are regulated by a partition plate 15 in accordance with the degree of opening of the air mix door 17a. Further, the amount of the cold air which passes through the heater core 14 at the bottom of the figure and the amount which passes through the bypass 16b are regulated by the partition plate 15 in accordance with the degree of opening of the air mix door 17b.

The evaporator 13 is a heat exchanger which is connected with a compressor (not shown), condenser, liquid receiver, and decompressor to constitute a known refrigeration cycle and, dehumidifies and cools the air in the case 12. The compressor is connected to the engine of the vehicle through an electromagnetic clutch (not shown), so the compressor can be driven or stopped by controlling the electromagnetic clutch.

The heater core 14 is a heat exchanger drawing its heat from the cooling water of the vehicle engine. It reheats the cold air cooled in the evaporator 13.

At the air outlet side of the case 12, there is a driver's side duct 18a for leading to the driver's side of the compartment the conditioned air regulated in temperature according to the degree of opening of the air mix door 17a and a passenger's side duct 18b for leading to the passenger's side of the compartment the conditioned air regulated in temperature according to the degree of opening of the air mix door 17b.

At the downstream end of the driver's side duct 18a there is a face duct 19a, a foot duct 20a, and a defroster duct 21. Among these, the face duct 19a branches into a center face duct 191a and a side face duct 192a. At the ends of these ducts 191a and 192a there is a center face outlet 193a and a side face outlet 194a for blowing the conditioned air to the upper torso of the driver. Further, at the end of the foot duct 20a there is a foot outlet 200a for blowing the conditioned air to the feet of the driver. At the end of the defroster duct 21 there is a defroster outlet 210 for blowing conditioned air to the inside surface of the windshield.

On the other hand, at the downstream end of the passenger's side duct 18 there is a face duct 19b and a foot duct 20b. Among these, the face duct 19b branches into a center face duct 191b and a side face duct 192b. At the ends of these ducts 191b and 192b there is a center face outlet 193b and a side face outlet 194b for blowing the conditioned air to the upper torso of the passenger. Further, at the end of the foot duct 20b there is a foot outlet 200b for blowing the conditioned air to the feet of the passenger.

At the air inlet positions of the face duct 19a, foot duct 20a, and defroster duct 21 there is a face door 22a, foot door 23a, and defroster door 24 for opening and closing those ducts. Among these, the face door 22a and the foot door 23a are driven by the same drive means 25a (specifically, a servo motor, see FIG. 2), while the defroster door 24 is driven by a separate drive means 26 (specifically, a servo motor, see FIG. 2).

At the air inlet positions of the face duct 19b and foot duct 20b, there is a face door 22b and a foot door 23b for opening and closing those ducts. The face door 22b and the foot door 23b are driven by the same drive means 25a (specifically, a servo motor, see FIG. 2).

Figure 2:
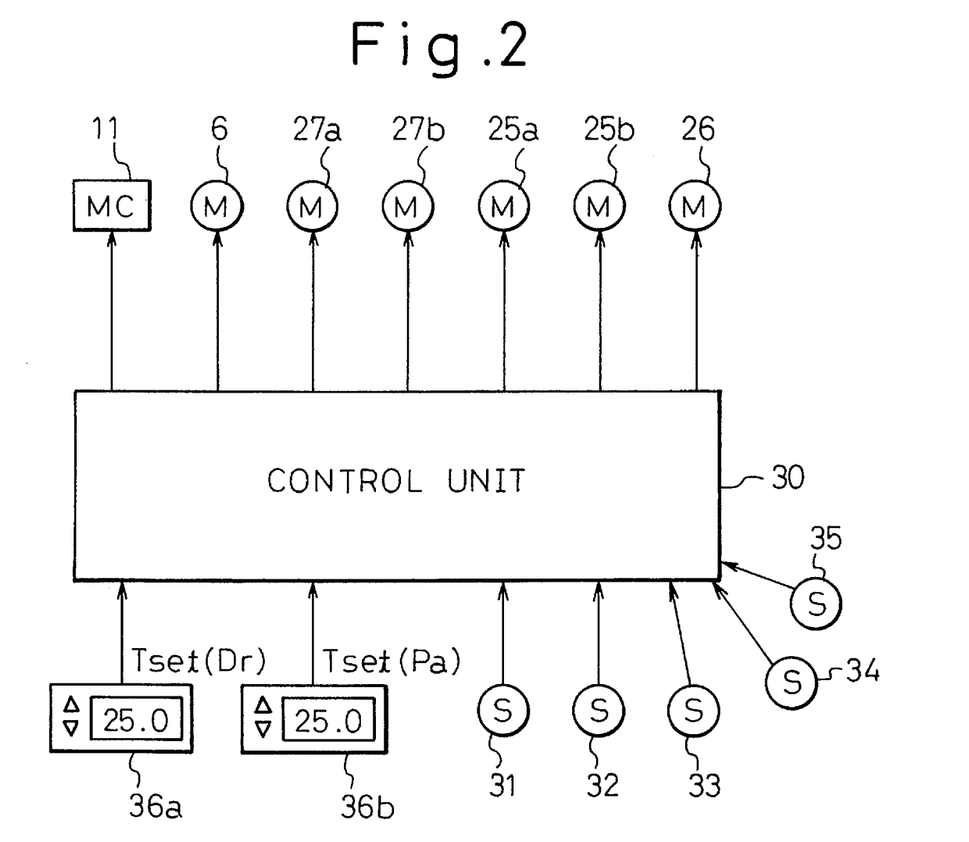
FIG. 2 is a block diagram of the control system of the above embodiment.

Further, as shown in FIG. 2, a control apparatus 30 for controlling the air-conditioner is connected to and receives input from an inside air temperature sensor 31 for detecting the temperature of the air in the compartment, an outside air temperature sensor 32 for detecting the temperature of the outside air, a sunlight sensor 33 for detecting the amount of sunlight in the compartment, a post-evaporator sensor 34 for detecting the temperature of the air right after passing through the evaporator 13, and a water temperature sensor 35 for indirectly detecting the temperature of the engine cooling water in the heater core 14. Further, the control apparatus 30 is connected to and receives input from a driver's side temperature setter 36a for setting the desired temperature Tset (Dr) in the compartment at the driver's side and a passenger's side temperature setter 36b for setting the desired temperature Tset (Pa) in the compartment at the passenger's side.

Note that the driver's side temperature setter 36a and passenger's side temperature setter 36b are disposed on the instrumentation panel provided at the front part of the compartment. Further, the sunlight sensor 33 is arranged at the center of the top of the dashboard of the compartment and is comprised of a two-surface sensor. It is designed so that the ratio of the sunlight striking these surfaces changes in accordance with the angle of incidence of the sunlight.

Figure 14:
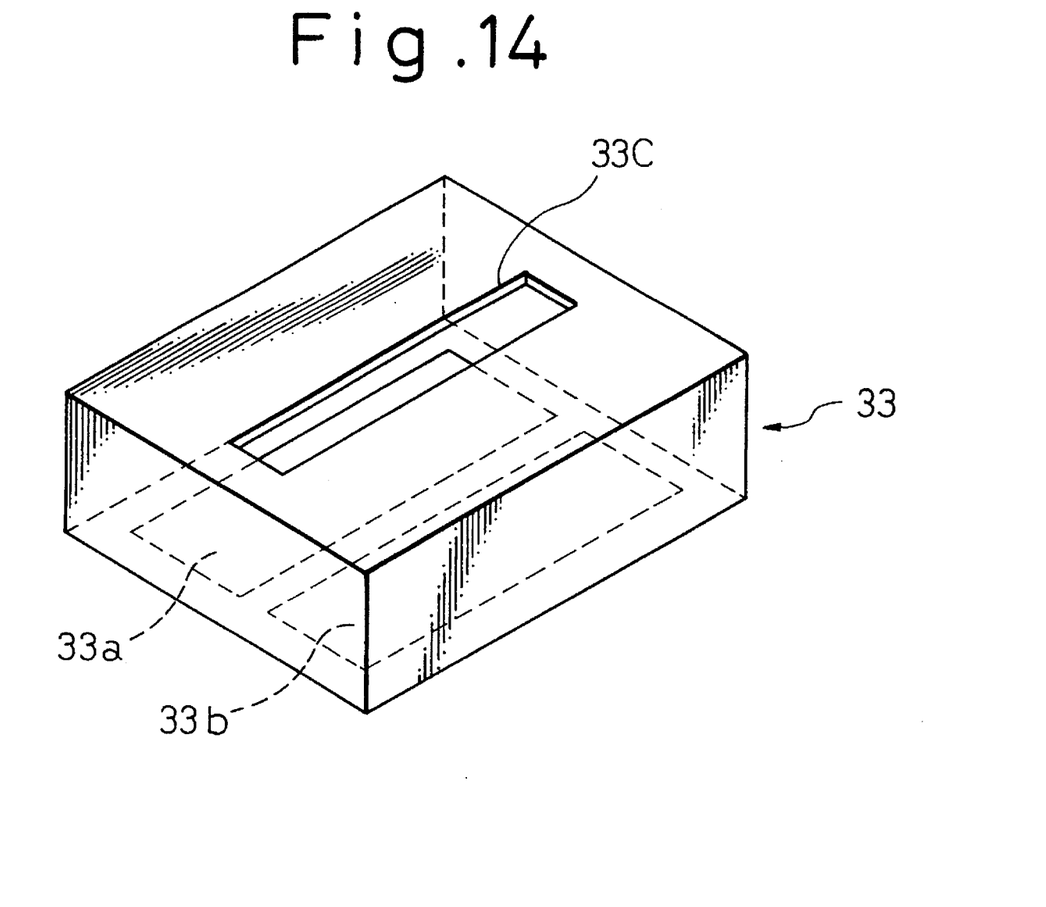
FIG. 14 is a perspective view of the construction of a sunlight sensor of the above embodiment.

Explaining this in more detail, the sunlight sensor 33 is provided with two light detectors 33a and 33b as shown in FIG. 14. The sunlight passes through the slit 33c and strikes the light detectors 33a and 33b. The amount of sunlight striking the driver's side and the passenger's side can be detected from the outputs of the light detectors 33a and 33b.

The control apparatus 30 is a known one provided inside with an A/D converter (not shown), microcomputer, etc. Signals from the sensors 31 to 35 are converted from an analog to digital format by the A/D converter and then input to the microcomputer.

The microcomputer is a known one including a CPU, ROM, RAM, I/O, etc. When the ignition switch of the engine is turned on, power is supplied from a battery (not shown).

Next, an explanation will be made of the operation of the embodiment using the flow chart of FIG. 3.

First, when the automatic control processing of the air-conditioner is started at step 100, the data is reset (initialized) at step 110. Next, at step 120, the signals (Tr, Tam, Ts, Te, and Tw) obtained by converting the values of the sensors 31 to 35 from an analog to digital format are read. The temperature setting Tset (Dr) set at the driver's side temperature setter 36a and the temperature setting Tset (Pa) set at the passenger's side temperature setter 36b are also read.

At step 130, the target blowing temperature of the conditioned air blown to the driver's side (hereinafter referred to as "TAO(Dr)") and the target blowing temperature of the conditioned air blown to the passenger's side (hereinafter referred to as "TAO(Pa)") are calculated. More specifically, as shown in FIG. 4, at step 131, the TAO(Dr) is calculated based on the following equation (1) stored in the ROM and then, at step 132, the TAO(Pa) is calculated based on the following equation (2) stored in the ROM:

$$TAO(Dr)=Kset\times Tset(Dr)-Kr\times Tr-Kam\times Tam-Ks\times Ts+C \tag{1}$$

$$TAO(Pa)=Kset\times Tset(Pa)-Kr\times Tr-Kam-Tam-Ks\times Ts+C \tag{2}$$

(where Kset, Kr, Kam, and Kam are gains and C is a correction coefficient).

Figure 5:
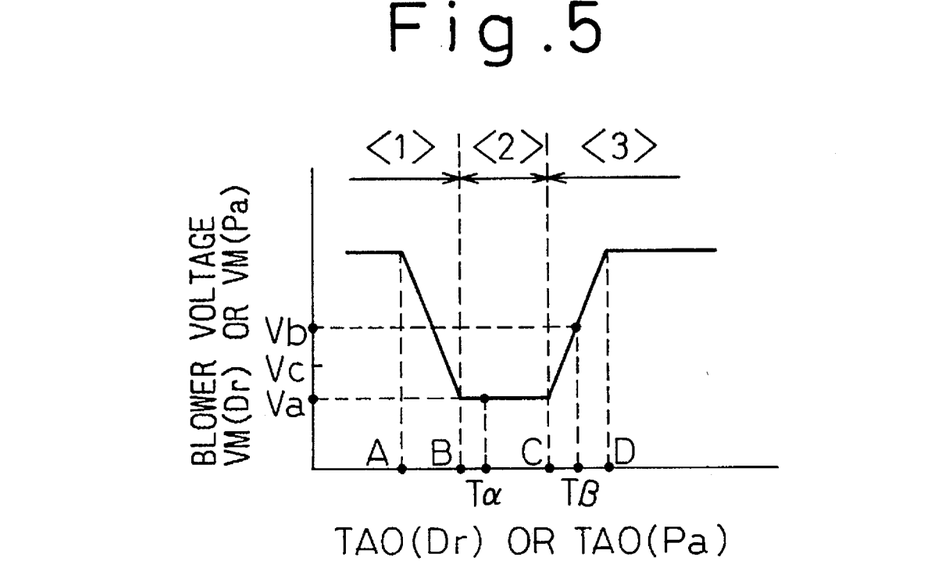
FIG. 5 is a graph of the relation between the target blowing temperatures and the blower voltages in the above embodiment.

Next, at step 140, the characteristics of FIG. 5 stored in the ROM are used to calculate the required driver's side blower voltage VM(Dr) and the required passenger's side blower voltage VM(Pa) from the above TAO(Dr) and TAO(Pa) and the mean blower voltage VM of the two is also calculated from VM(Dr) and VM(Pa).

Figure 6:
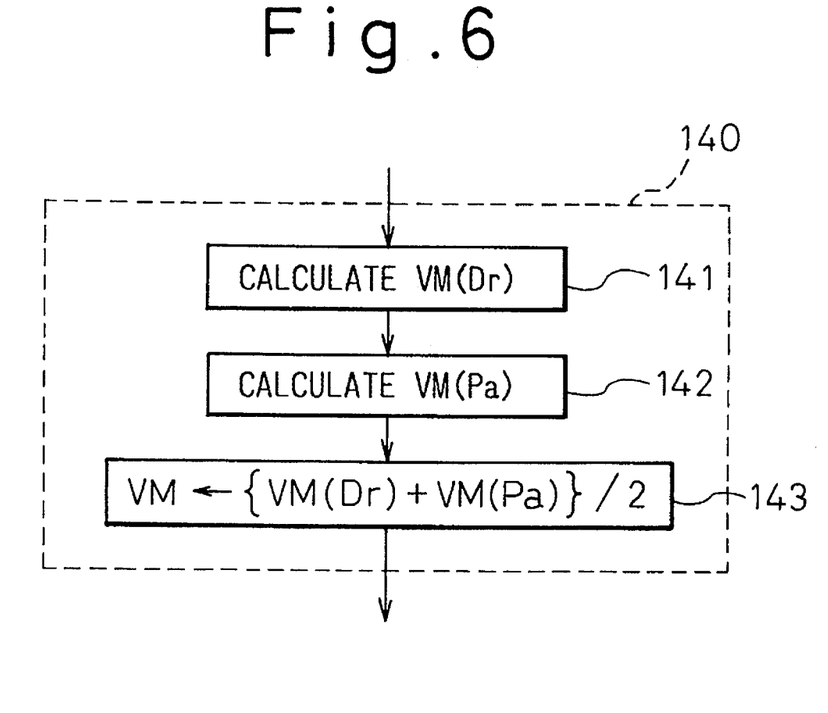
FIG. 6 is a view of the content of step 140 in FIG. 3.

Specifically, as shown in FIG. 6, at step 141, VM(Dr) is calculated from the above TAO(Dr) and the characteristics of FIG. 5. Then, at step 142, the above VM(Pa) is calculated from the above TAO(Pa) and the characteristics of FIG. 5. At step 143, the blower voltage VM to be finally supplied to the blower motor 9 is calculated based on the VM(Dr), VM(Pa), and the following equation (3) stored in the ROM:

$$VM=\{VM(Dr)+VM(Pa)\}/2 \tag{3}$$

Note that the characteristics of FIG. 5 mentioned above are a non-linear relationship of TAO and VM set so as to increase the flow of air to maintain the cooling ability when the target blowing temperature TAO is in the region <1>, change the blowing temperature and change the amount of heat supplied by making the flow of air constant when TAO is in the region <2>, and increase the flow of air to maintain the heating ability when TAO is in the region <3>.

The blower voltage at the region <2> in the characteristics of FIG. 5 becomes higher as the amount of sunlight detected by the sunlight detector 33 becomes great. Further, the blower voltage at the region <2> is determined from the output from the surface of the two-surface sunlight sensor 33 that senses more the sunlight.

Figure 7:
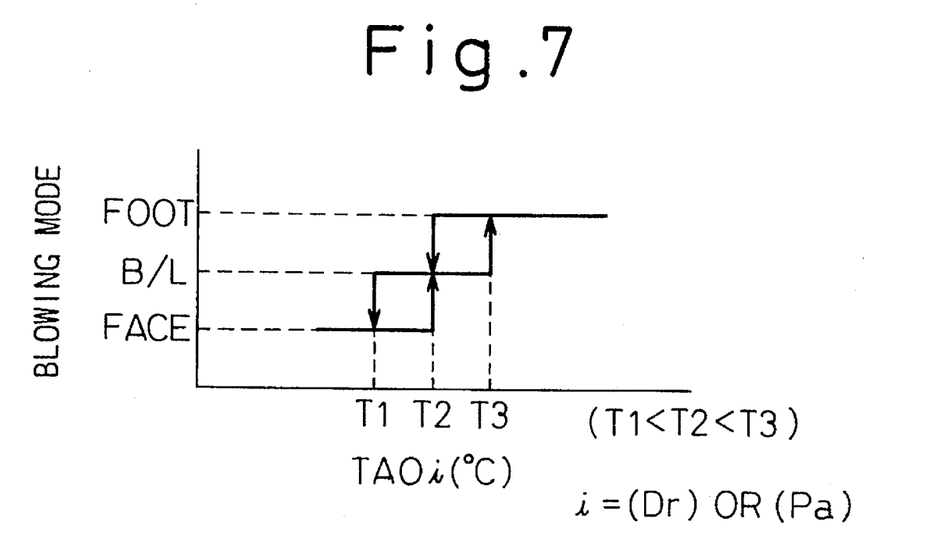
FIG. 7 is a graph of the relation between the target blowing temperatures and the blowing modes in the above embodiment.

Referring back to FIG. 3, at step 150, the blowing modes of the driver's side and passenger's side are selected from the above TAO(Dr), TAO(Pa), and the characteristics of FIG. 7 are stored in the ROM. Here, the "face mode" is the mode for blowing conditioned air from the face outlet, the "B/L (bilevel) mode" is the mode for blowing conditioned air from the face outlet and the foot outlet, and the "foot mode" is the mode for blowing conditioned air from the foot outlet.

At step 160, the degrees of opening SW(Dr) and SW(Pa) of the air mix doors 17a and 17b are calculated based on the following equation (4) stored in the ROM:

$$SWi=\{(TAOi-Te)/(Tw-Te)\}\times 100\ (\%) \tag{4}$$

(where, i=(Dr) or (Pa)).

At step 170 to step 190, the blower controller 11 and the servo motors 25a, 25b, 27a, and 27b for opening and closing the bypasses 18a and 18b, etc. are driven and controlled so as to obtain the targets of control calculated at the above step 140 to step 160.

According to the above control processing, when TAO(Dr)=Tα and TAO(Pa)=Tβ, the blower voltage VM, which is finally supplied to the blower motor 9, becomes the mean value Vc (=(Va+Vb)/2) of the blower voltage (Va) corresponding to TAO=Tα and the blower voltage (Vb) corresponding to TAO=Tβ. Accordingly, the flow of air for TAO(Dr) is sufficiently secured and the flow of air corresponding to TAO(Pa) is also sufficiently secured since the flow of air for TAO (Pa) is larger than if the blower voltage finally supplied to the blower motor 9 was simply Va.

Since VM becomes a value larger than Va in this way, the flows of air for TAO(Dr) and TAO(Pa) are both secured and therefore it becomes easy to control independently the temperatures at the driver's side of the compartment and at the passenger's side of the compartment. Further, in this embodiment, since VM is made the mean value Vc of Va and Vb, it is also possible to prevent the flow of air from becoming larger than necessary.

Figure 3:
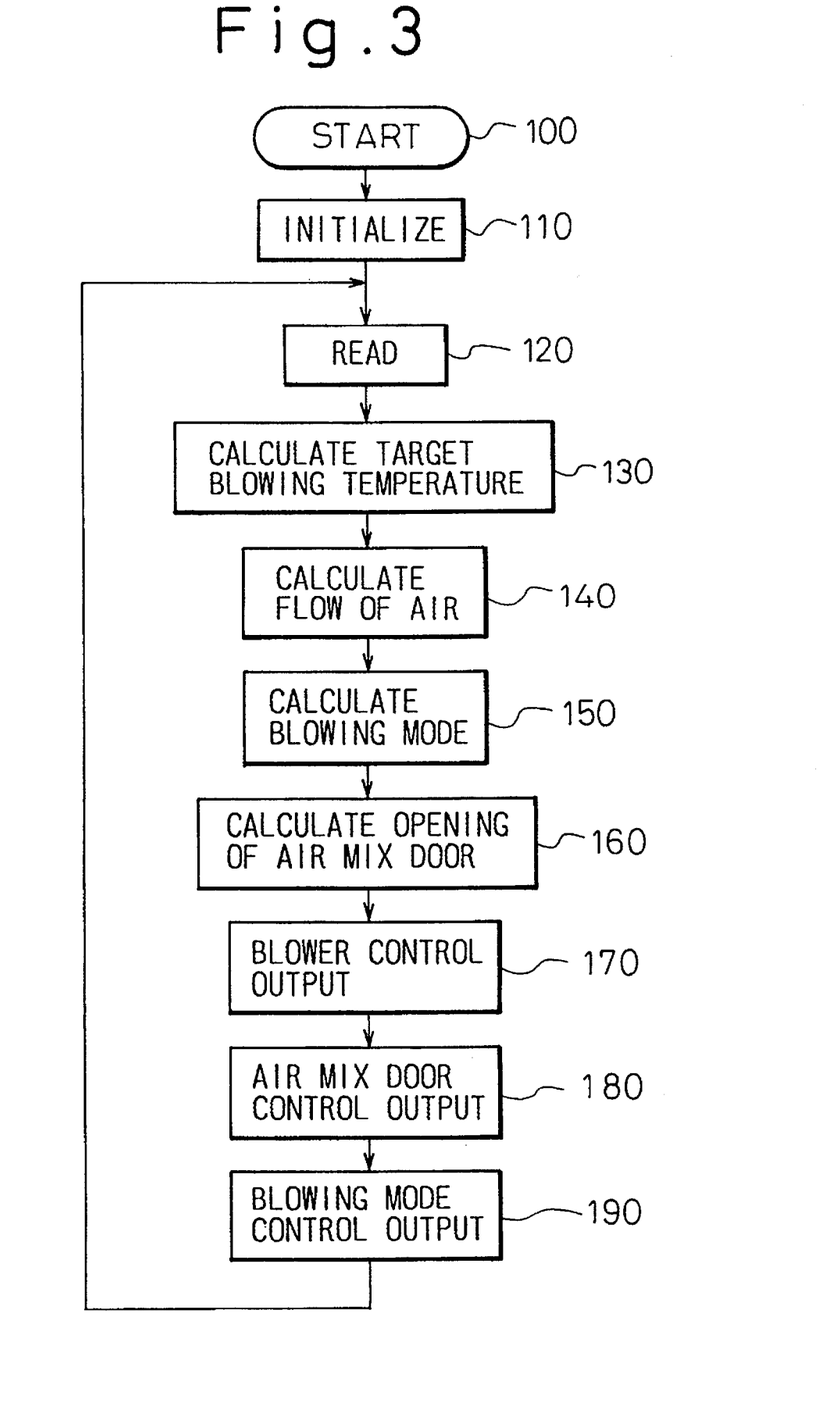
FIG. 3 is a flow chart of the above embodiment.
Figure 4:
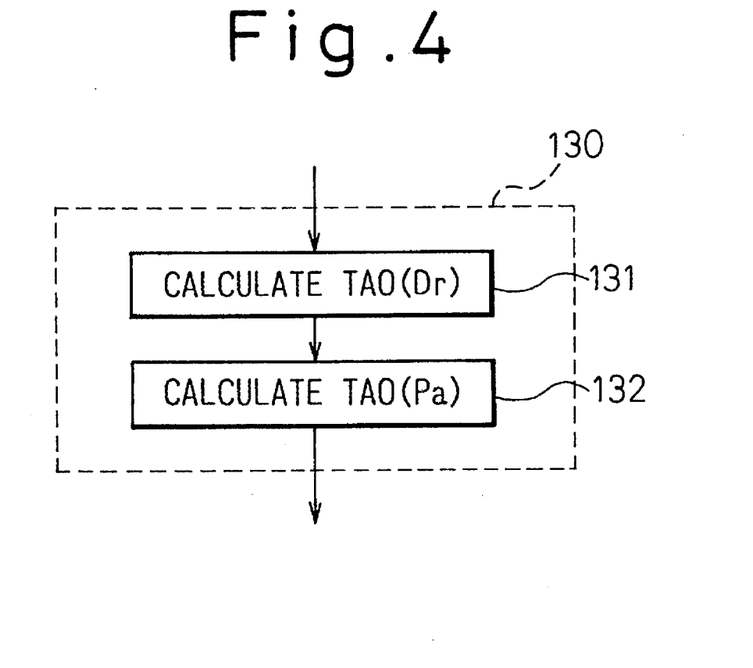
FIG. 4 is a view of the content of step 130 in FIG. 3.

Note that the steps of the flow chart shown in FIGS. 3, 4, and 6 constitute the means for realizing those functions.

Next, an explanation will be made of a second embodiment of the present invention. In this embodiment, only the portion of step 140 differs from the first embodiment, so only that portion will be explained.

Figure 8:
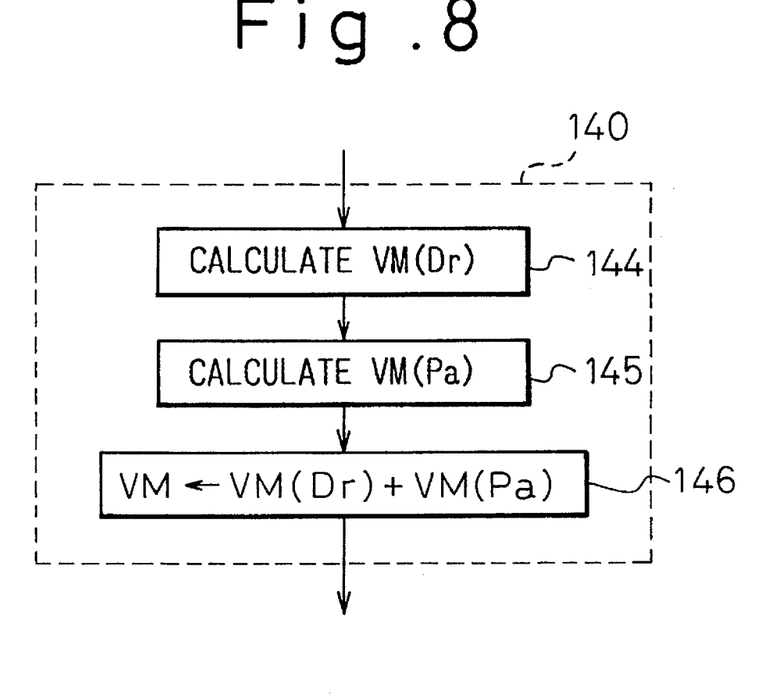
FIG. 8 is a view of the content of step 140 of FIG. 3, different from that of FIG. 6, as a second embodiment of the present invention.

FIG. 8 is a view of the content of step 140 of this embodiment. As shown in FIG. 8, first, at step 144, VM(Dr) is calculated from TAO(Dr) and the characteristics of FIG. 9. Next, at step 145, VM(Pa) is calculated from TAO(Pa) and the characteristics of FIG. 9. At step 146, the blower voltage VM finally supplied to the blower motor 9 is calculated from VM(Dr), VM(Pa), and the following equation (5) stored in the ROM:

$$VM=VM(Dr)+VM(Pa) \quad (5)$$

Figure 9:
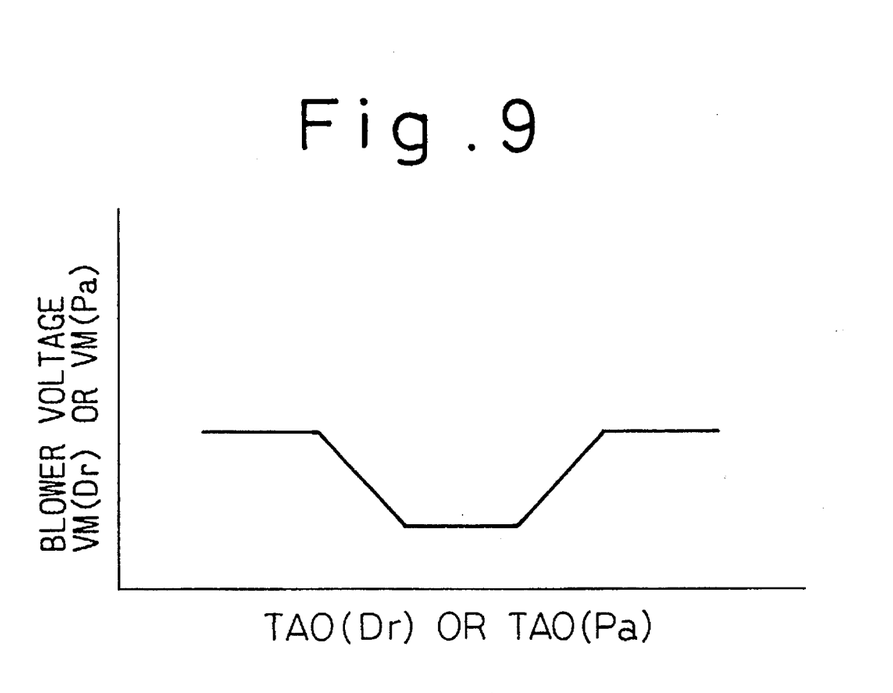
FIG. 9 is a graph of the relation between the target blowing temperatures and the blower voltages in the second embodiment.

Note that the characteristics of FIG. 9 are set so that the blower voltage corresponding to TAO becomes half of the blower voltage determined from the characteristics of FIG. 5 of the first embodiment.

In this way, when calculating VM(Dr) and VM(Pa) based on the characteristics of FIG. 9, addition of VM(Dr) and VM(Pa) gives a result equal to the mean value VM referred to in the first embodiment. Further, by adding VM(Dr) and VM(Pa) in this way, a value is obtained which is larger than the doubled value of the lower of VM(Dr) and VM(Pa) (the lower value of VM(Dr) and VM(Pa) referred to in the first embodiment). Accordingly, a similar effect to the first embodiment is exhibited in this embodiment as well.

In the first embodiment, the blower voltage VM finally supplied to the blower motor 9 was made the mean value of VM(Dr) and VM(Pa), but as another embodiment it is also possible to make VM the larger of VM(Dr) and VM(Pa) when it is difficult to independently control the temperature in the compartment at the driver's side and the passenger's side due to differences in the construction of the compartment. Toward that end, a selecting means may be provided. In this case, the total amount of air blown into the compartment becomes greater, so it is possible to provide a difference to the amount of heat of the conditioned air blown to the individual sides even if the difference of temperature of the air blown to the individual sides is small.

Further, in the above embodiments, the heat loads at the driver's side and the passenger's side were detected by a single inside air temperature sensor 31, a single outside air temperature sensor 32, and a single sunlight sensor 33, but it is also possible to provide inside air temperature sensors at both of the driver's side and the passenger's side and detect the heat loads of the sides (inside air temperatures) by those inside air temperature sensors individually. In this case, TAO(Dr) is calculated based on the temperature setting Tset(Dr), driver's side inside air temperature Tr(Dr), outside air temperature Tam, and sunlight Ts, while TAO(Pa) is calculated based on Tset(Pa), passenger's side inside air temperature Tr(Pa), outside air temperature Tam, and sunlight Ts.

Further, instead of the inside air temperature sensor 31, it is possible to provide sunlight sensor 33 at both the driver's side and the passenger's side to detect the heat loads (amounts of sunlight) of the sides by these sunlight sensors. In this case, TAO(Dr) is calculated based on the temperature setting Tset(Dr), inside air temperature Tr, outside air temperature Tam, and driver's side sunlight Ts(Dr), while TAO(Pa) is calculated based on Tset(Pa), the inside air temperature Tr, the outside air temperature Tam, and the passenger's side sunlight Ts(Pa).

Of course, it is also possible to provide both the inside air temperature sensor 31 and the sunlight sensor 33 at the driver's side and the passenger's side and, further, it is possible to provide an outside air temperature sensor 32 at each of the sides.

Next, an explanation will be made of a third embodiment of the present invention. When the driver's side target blowing temperature TAO(Dr) and the passenger's side target blowing temperature TAO(Pa) are Tα and Tβ, respectively, in the graph of FIG. 5 explained with reference to the first embodiment, there is a temperature range B–C (constant region) where the blower voltage calculated becomes constant even if the values of Tα and Tβ change and temperature ranges A–B and C–D (fluctuating regions) where the calculated blower voltage changes.

Therefore, in the third embodiment, after the values of Tα and Tβ are detected as the target blowing temperatures, a judgment is made as to which of these temperature ranges the values Tα and Tβ belong. If the result of the judgment, for example, as shown in FIG. 5, is that one value Tα is in the temperature range B–C of the constant region, while the other value Tβ is in the temperature range C–D, the value Tα is changed to the boundary value C, which is at the end of the constant region, to make Tα=C so that a larger blower voltage, that is, flow of air, is calculated. That is, the value Tα, which gives a relatively small blower voltage since it is in the constant region is corrected so that it approaches the boundary C between the constant region and the fluctuating region in the direction of the other value Tβ giving a larger blower voltage.

In subsequent processing, like in the related art shown in FIG. 10, the mean value Tτ of the value Tα and Tβ of the corrected target blowing temperatures is calculated and the blower voltage Vc corresponding to the mean value Tτ of the blower temperatures is determined by the map such as in FIG. 5. The blower voltage Vc calculated in this way becomes a value between the blower voltages Va and Vb in the same way as the first embodiment, so a similar effect is obtained as with the first embodiment by the third embodiment.

Next, an explanation will be made of a fourth embodiment of the present invention. In the fourth embodiment as well, the characterizing feature lies in the content of step 140 in the flow chart of FIG. 3. The other steps are similar to the earlier embodiments. Accordingly, in the same way as the first embodiment, at step 130, the driver's side target blowing temperature TAO(Dr) and the passenger's side target blowing temperature TAO(Pa) are calculated by the above equations (1) and (2).

Next, at step 140, the characteristics of FIG. 5 stored in the ROM are used to calculate the required driver's side blower voltage VM1(Dr) and the required passenger's side blower voltage VM2(Pa) from TAO(Dr) and TAO(Pa) and the mean blower voltage VM1 is calculated.

Figure 12:
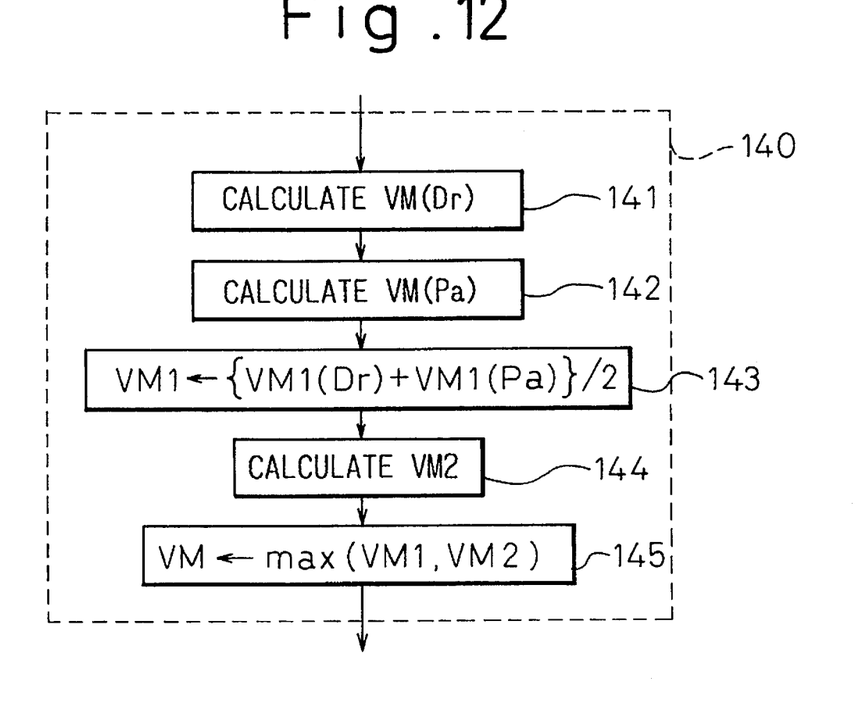
FIG. 12 is a view of the content of step 140 of FIG. 3, different from those of FIG. 6 and FIG. 8, as a fourth embodiment of the present invention.

Specifically, as shown in FIG. 12, at step 141, VM1(Dr) is calculated from the above TAO(Dr) and the characteristics of FIG. 5. Then, at step 142, the above VM1(Pa) is calculated from the above TAO(Pa) and the characteristics of FIG. 5. At step 143, the mean blower voltage VM1 is calculated based on the VM1(Dr), VM1(Pa), and following equation (6) stored in the ROM:

$$VM1=\{VM1(Dr)+VM1(Pa)\}/2 \quad (6)$$

Figure 11:
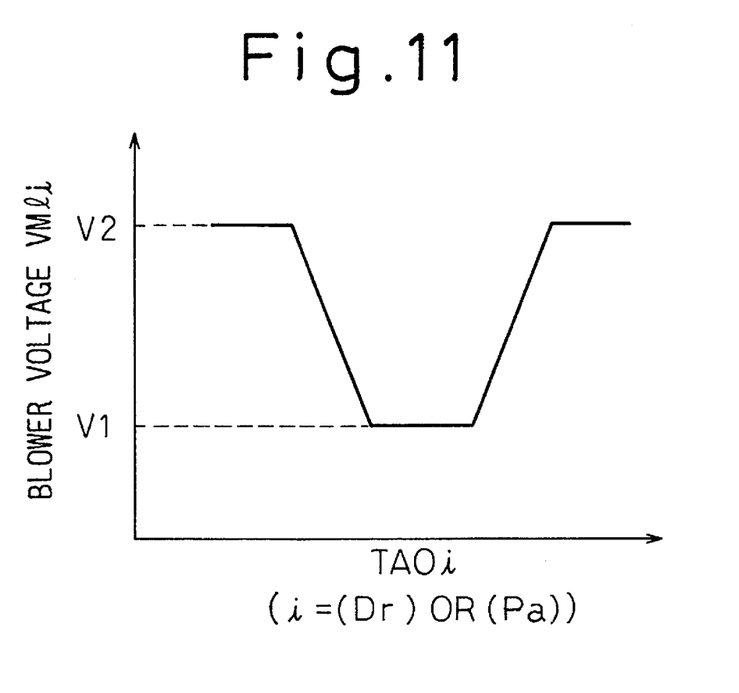
FIG. 11 is a graph of the relation between the target blowing temperatures and the blower voltages in a fourth embodiment of the present invention.
Figure 13:
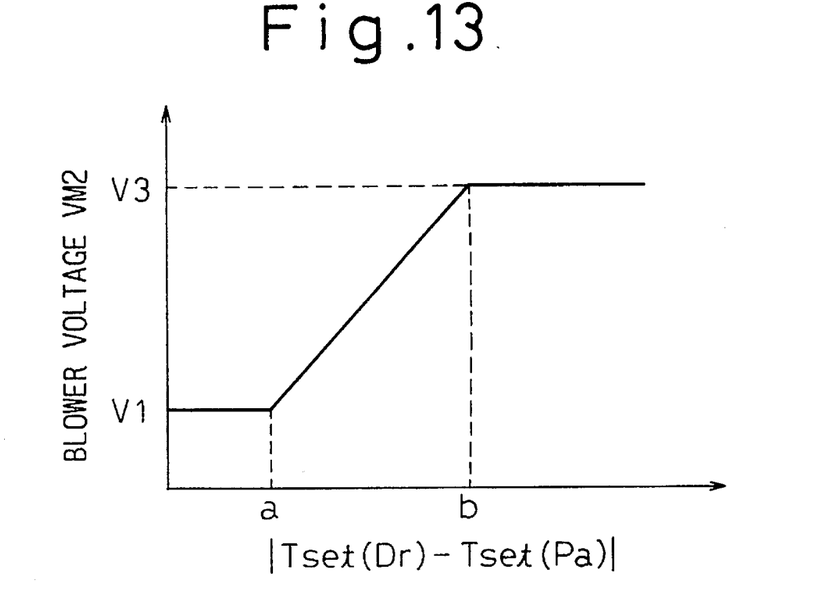
FIG. 13 is a graph of the relation between the temperature settings of the individual sides and the blower voltage VM2 in the above embodiment.

Next, at step 144, the blower voltage giving the minimum flow of air required for independently controlling the temperatures of the driver's side and the passenger's side when there is a difference in the temperature settings is calculated from the difference between the Tset(Dr) and Tset(Pa) (|Tset(Dr)−Tset(Pa)|) and the characteristics of FIG. 13 stored in the ROM. Note that the blower voltage V3, that is, the upper limit of VR2, is a value satisfying the relationship of V1<V3<V2 with respect to the blower voltages V1 and V2 shown in FIG. 11, which is the same in content as FIG. 5.

Further, the characteristics of FIG. 13 are set so that VM2=V1 when |Tset(Dr)–Tset(Pa)|<a, VM2 increases linearly along with the increase of |Tset(Dr)–Tset(Pa)| when |Tset(Dr)–Tset(Pa)|<b, and VM2=V3 when |Tset(Dr)–Tset(Pa)|>b. In this embodiment, the constant a is set to 1° C. and the constant b is set to 5° C. That is, when Tset(Dr)= 25° C. and Tset(Pa)=26° C., VM2=V1.

Next, at step 145, the above VM1 and VM2 are compared and the larger of them is calculated as the blower voltage to be finally supplied to the blower controller 11. After this, in the same way as in the first embodiment, at step 150, the blowing modes of the driver's side and passenger's side are selected from the TAO(Dr) and TAO(Pa) and the characteristics of FIG. 7 stored in the ROM.

According to the above control routine, at step 145, the larger of VM1 and VM2 is made the final blower voltage VM, so the blower voltage is always a voltage of at least VM2. VM2 is the minimum flow of air required for independently controlling the temperatures of the driver's side and passenger's side when there is a predetermined difference in temperature settings (|Tset(Dr)–Tset(Pa)|), so the flow of air required for independently controlling the temperatures of the driver's side and passenger's side is constantly ensured and, as a result, it is possible to independently control the temperatures of the driver's side and passenger's side at all times.

In the above embodiment, VM2 was calculated, as shown in FIG. 13, based on the difference in temperature settings, but as another embodiment it is also possible to calculate VM2 based on the difference of the target blowing temperatures of the sides. That is, a difference in the target blowing temperatures of the sides means a difference in the amount of heat supplied to the sides. In this case as well, when there is a large difference in the target blowing temperatures, independent control of the temperatures of the sides becomes easier the larger the amount of air blown. Accordingly, by setting VM2 larger, there is a larger difference in the target blowing temperatures, and by making the larger of VM2 and VM1 the final blowing voltage as in this embodiment, it becomes possible to independently control the temperatures of the driver's side and the passenger's side in the same way as in the fourth embodiment.

In another example, it is possible to calculate VM2 as shown in FIG. 13 based on the difference of the outputs of the two surfaces of a two-surface sunlight sensor 33. That is, a difference in the outputs of the two surfaces means a difference of the heat loads caused by sunlight at the driver's side and the passenger's side and it is necessary to give a difference to the blowing temperatures. Accordingly, in this case as well, since the amounts of heat supplied to the sides differ, the VM2 is set larger, creating a larger, creating a difference of the outputs of the two surfaces, and the larger of VM1 and VM2 is made the final blower voltage so as to enable independent control of the temperatures of the driver's side and passenger's side at all times.

Further, it is possible to calculate VM2 based on the differences of the blowing modes of the two sides. That is, in general, the blowing temperature increases in the order of the face mode→bilevel mode→foot mode, so if the blowing mode differs, the blowing temperature differs as well. Accordingly, if the blowing mode differs, the amounts of heat supplied to the two sides differ as well. Therefore, in this case as well, by setting VM2 in accordance with the difference in the blowing modes and making the larger of VM2 and VM1 the final blower voltage, it is possible to independently control the temperature of the driver's side and the passenger's side.

Further, in the above embodiment, the heat loads at the driver's side and the passenger's side were detected by a single inside air temperature sensor 31, a single outside air temperature sensor 32, and a single sunlight sensor 33, but it is also possible to provide inside air temperature sensors at both the driver's side and passenger's side and detect the heat loads of the sides (inside air temperatures) by those inside air temperature sensors. In this case, TAO(Dr) is calculated based on the temperature setting Tset(Dr), driver's side inside air temperature Tr(Dr), outside air temperature Tam, and sunlight Ts, while TAO(Pa) is calculated based on Tset(Pa), passenger's side inside air temperature Tr(Pa), outside air temperature Tam, and sunlight Ts.

Of course, it is also possible to provide both the inside air temperature sensor 31 and the sunlight sensor 33 at the driver's side and the passenger's side and, further, it is possible to provide an outside air temperature sensor 32 at each of the sides.

We claim:

1. A vehicular air-conditioner comprising:

means for calculating a first target blowing temperature from a first temperature setting and heat load in a compartment;

means for calculating a second target blowing temperature from a second temperature setting and heat load in the compartment;

means for selecting an air flow signal corresponding to a flow of conditioned air sent into the compartment by a predetermined pattern based on said first target blowing temperature and said second target blowing temperature, said predetermined pattern including fluctuating regions where said air flow signal is changed in accordance with changes in said first and second target blowing temperatures and a constant region where said air flow signal is kept constant regardless of changes in said first and second target blowing temperatures, said air flow signal corresponding to a flow of air of at least the mean value of the flow of air at said first target blowing temperature and the flow of air at said second target-blowing temperature when either said first target blowing temperature or said second target blowing temperature is in the constant region; and means for exercising control to give a flow of air corresponding to the air flow signal.

2. A vehicular air-conditioner comprising:

means for calculating a first target blowing temperature from a first temperature setting and heat load in a compartment;

means for calculating a second target blowing temperature from a second temperature setting and heat load in the compartment;

means for selecting an air flow signal corresponding to a flow of conditioned air sent into the compartment by a predetermined pattern based on said first target blowing temperature and said second target blowing temperature, said predetermined pattern including fluctuating regions where said air flow signal is changed in accordance with changes in said first and second target blowing temperatures and a constant region where said air flow signal is kept constant regardless of changes in said first and second target blowing temperatures;

means for exercising control to give a flow of air corresponding to the air flow signal; and signal correcting means for correcting a target blowing temperature in the constant region to a third target blowing temperature at the boundary of the constant region and the fluctuating region when one of said first and second target blowing temperatures is in the constant region, wherein said selecting means selects the air flow signal corresponding to the flow of air between the flow of air at said first target blowing temperature and the flow of air at said second target blowing temperature based on the third target blowing temperature corrected by said signal correcting means and the other of said first and second target blowing temperatures.

3. A vehicular air-conditioner comprising:

means for calculating a first target blowing temperature from a first temperature setting and heat load in a compartment;

means for calculating a second target blowing temperature from a second temperature setting and heat load in the compartment;

means for selecting an air flow signal corresponding to a flow of conditioned air sent into the compartment by a predetermined pattern based on said first target blowing temperature and said second target blowing temperature, said predetermined pattern including fluctuating regions where said air flow signal is changed in accordance with changes in said first and second target blowing temperatures and a constant region where said air flow signal is kept constant regardless of changes in said first and second target blowing temperatures, wherein said air flow signal is a signal which is different from the signal of said first target blowing temperature and said second target blowing temperature when either said first target blowing temperature or said second target blowing temperature is in the constant region, said air flow signal corresponding to a flow of air between the flow of air at said first target blowing temperature and the flow of air at said second target blowing temperature; and means for exercising control to give a flow of air corresponding to the air flow signal.

4. A vehicular air-conditioner for independently controlling the temperatures of a first air-conditioning zone and a second air-conditioning zone in a vehicle compartment by blowing conditioned air of a first temperature and a second temperature from a first outlet and a second outlet corresponding to the first and second air-conditioning zones, said vehicular air-conditioner comprising:

a blowing means for generating a flow of air;

a first air passage for leading the air from said blowing means to said first outlet;

a second air passage for leading the air from said blowing means to said second outlet;

a first temperature setting means for setting the temperature of said first air-conditioning zone;

a second temperature setting means for setting the temperature of said second air-conditioning zone;

a heat load detecting means for detecting the heat loads of said first air-conditioning zone and said second air-conditioning zone;

a first target blowing temperature calculating means for calculating the target blowing temperature of air blown from said first outlet to said first air-conditioning zone based on the temperature setting set by said first temperature setting means and the heat load detected by said heat load detecting means;

a second target blowing temperature calculating means for calculating the target blowing temperature of air blown from said second outlet to said second air-conditioning zone based on the temperature setting set by said second temperature setting means and the heat load detected by said heat load detecting means;

a first air flow calculating means for calculating a first flow of air of said blowing means based on said first target blowing temperature;

a second air flow calculating means for calculating a second flow of air of said blowing means based on said second target blowing temperature;

a final air flow calculating means for calculating a final flow of air based on the first flow of air calculated by said first air flow calculating means and the second flow of air calculated by said second air flow calculating means wherein the final flow of air is calculated from the first flow of air when the first and second flows of air are equal, and the final flow of air is calculated to be larger than the smaller of the first and second flows of air when the first flow of air and the second flow of air differ; and an air flow controlling means for controlling said blowing means so that the flow of air of said blowing means becomes the flow of air calculated by said final air flow calculating means.

5. A vehicular air-conditioner as set forth in any one of claims 2 to 4 wherein said air flow signal is a mean value of the flow of air at said first target blowing temperature and the flow of air at said second target blowing temperature.

6. A vehicular air-conditioner for independently controlling the temperatures of a first air-conditioning zone and a second air-conditioning zone in a vehicle compartment by blowing conditioned air of a first temperature and a second temperature from a first outlet and a second outlet corresponding to the first and second air-conditioning zones, said vehicular air-conditioner comprising:

a blowing means for generating a flow of air;

a first air passage for leading the air from said blowing means to said first outlet;

a second air passage for leading the air from said blowing means to said second outlet;

a first temperature setting means for setting the temperature of said first air-conditioning zone;

a second temperature setting means for setting the temperature of said second air-conditioning zone;

a heat load detecting means for detecting the heat loads of said first air-conditioning zone and said second air-conditioning zone;

a first target blowing temperature calculating means for calculating the target blowing temperature of air blown from said first outlet to said first air-conditioning zone based on the temperature setting set by said first temperature setting means and the heat load detected by said heat load detecting means;

a second target blowing temperature calculating means for calculating the target blowing temperature of air blown from said second outlet to said second air-conditioning zone based on the temperature setting set by said second temperature setting means and the heat load detected by said heat load detecting means;

a first air flow calculating means for calculating a first flow of air of said blowing means based on said first target blowing temperature;

a second air flow calculating means for calculating a second flow of air of said blowing means based on said second target blowing temperature;

a final air flow calculating means for calculating a final flow of air based on the first flow of air calculated from said first air flow calculating means and the second flow of air calculated from said second air flow calculating means, wherein the final flow of air is a sum of the first flow of air and the second flow of air when the flows of air are equal, and the final flow of air is at least double the value of the smaller of the first and second flows of air when the flows of air differ; and an air flow controlling means for controlling said blowing means so that the flow of air of said blowing means becomes the flow of air calculated by said final air flow calculating means.

7. A vehicular air-conditioner designed to independently control the temperatures of a first air-conditioning zone and a second air-conditioning zone in a vehicle compartment by blowing conditioned air of a first temperature and a second temperature from a first outlet and a second outlet provided corresponding to the first and second air-conditioning zones, said vehicular air-conditioner comprising:

a blowing means for generating a flow of air;

a first air passage for leading the air from said blowing means to said first outlet;

a second air passage for leading the air from said blowing means to said second outlet;

a first signal generating means for generating a first signal to change the temperature of the air blown from the first outlet;

a second signal generating means for generating a second signal to change to the temperature of the air blown from the second outlet;

a differential air flow calculating means for calculating the difference between the magnitude of said first signal and the magnitude of said second signal and calculating a differential flow of air which increases as the difference increases;

a final air flow calculating means for calculating a final flow of air of said blowing means which is larger than the differential flow of air calculated by said differential air flow calculating means;

an air flow controlling means for controlling said blowing means so that the flow of air of said blowing means becomes the flow of air calculated by said final air flow calculating means;

a first air flow calculating means for calculating a first flow of air of said blowing means based on a first target blowing temperature;

a second air flow calculating means for calculating a second flow of air of said blowing means based on a second target blowing temperature; and an air-conditioning air flow calculating means for calculating the flow of air of said blowing means based on the first flow of air calculated by said first air flow calculating means and the second flow of air calculated by said second air flow calculating means, said final air flow calculating means being a selecting means for selecting the larger of the air-conditioning flow of air calculated by said air-conditioning air flow calculating means and the differential flow of air calculated by said differential air flow calculating means.

8. A vehicular air-conditioner as set forth in claim 7, wherein said first signal generating means is comprised of a first temperature setting means and said second signal generating means is comprised of a second temperature setting means.

9. A vehicular air-conditioner as set forth in claim 7, wherein said first signal generating means is comprised of a first target blowing temperature calculating means and said second signal generating means is comprised of a second target blowing temperature calculating means.

10. A vehicular air-conditioner as set forth in claim 7 further comprising a heat load detecting means having a first sunlight detecting means for detecting the amount of sunlight in said first air-conditioning zone and a second sunlight detecting means for detecting the amount of sunlight in said second air conditioning zone wherein said first signal generating means includes said first sunlight detecting means, and said second signal generating means includes said second sunlight detecting means.

* * * * *